United States Patent
Blumenstein et al.

[11] Patent Number: 5,334,658
[45] Date of Patent: Aug. 2, 1994

[54] THERMOPLASTIC MODLING MATERIALS

[75] Inventors: Uwe Blumenstein, Ludwigshafen; Peter Klaerner, Battenberg; Horst Schuch, Ilvesheim; Hans-Michael Walter, Freinsheim, all of Fed. Rep. of Germany

[73] Assignee: BASF Aktiengesellschaft, Ludwigshafen, Fed. Rep. of Germany

[21] Appl. No.: 991,650

[22] Filed: Dec. 16, 1992

Related U.S. Application Data

[63] Continuation of Ser. No. 709,206, Jun. 3, 1991, abandoned.

[30] Foreign Application Priority Data

Jun. 7, 1990 [DE] Fed. Rep. of Germany ....... 4018230

[51] Int. Cl.$^5$ .............................................. C08L 51/04
[52] U.S. Cl. ................................................... 525/71
[58] Field of Search .......................... 525/71, 313, 316

[56] References Cited

U.S. PATENT DOCUMENTS

| | | | |
|---|---|---|---|
| 4,146,589 | 3/1979 | Dupre . | |
| 4,185,503 | 1/1991 | Brunstat et al. | 525/316 |
| 4,424,304 | 1/1984 | Hambrecht et al. | 525/68 |
| 4,493,922 | 1/1985 | Echte et al. | 525/71 |
| 4,567,232 | 1/1986 | Echte et al. | 525/53 |
| 4,785,051 | 11/1988 | Henton . | |
| 4,839,418 | 6/1989 | Schwaben et al. | 525/53 |
| 4,874,815 | 10/1989 | Bubeck et al. | 525/84 |
| 5,041,498 | 8/1991 | Hare et al. | 525/316 |

FOREIGN PATENT DOCUMENTS

| | | |
|---|---|---|
| 0048389 | 3/1982 | European Pat. Off. . |
| 2603289 | 11/1976 | Fed. Rep. of Germany . |
| 2620579 | 12/1976 | Fed. Rep. of Germany . |

OTHER PUBLICATIONS

Echte, A. "Rubber-Toughened Styrene Polymers. A Review" ACS (1989).
Seymour, R. B. "Origin and Early Development of Rubber-Toughened Plastics" ACS (1989).

*Primary Examiner*—Vasu S. Jagannathan
*Attorney, Agent, or Firm*—Oblon, Spivak, McClelland, Maier & Neustadt

[57] ABSTRACT

A thermoplastic molding material contains, based on the sum of A and B,

A: from 75 to 97% by weight of a polystyrene A as a hard matrix and

B: from 3 to 25% by weight of a particulate, elastomeric (co)polymer B based essentially on butadiene or its copolymers, in turn consisting of, based on B, B1: from 40 to 98% by weight of a (co)polymer B1 having a mean particle size of from 100 to 600 nm and B2: from 2 to 60% by weight of a particle blend B2 which in turn consists of, based on B2, B21: from 1 to 60% by weight of a (co)polymer B21 having a particle size of from 200 to 1,200 nm and B22: from 40 to 99% by weight of a (co)polymer B22 having a mean particle size of from 1,200 to 8,000 nm, (co)polymer B1 having an encapsulated-particle morphology and (co)polymers B21 and B22 having a cellular and/or coiled particle morphology.

12 Claims, No Drawings

THERMOPLASTIC MODLING MATERIALS

This is a continuation of application Ser. No. 07/709,206, filed on Jun. 3, 1991.

The present invention relates to thermoplastic molding materials which have a high impact strength and which essentially contain polystyrene as a matrix and, uniformly distributed in this matrix, various amounts of rubber-like particles forming a soft phase and having different mean particle sizes; the soft phase of interest below is essentially composed of polybutadiene or block polymers of butadiene and styrene. The following patents relate to such molding materials containing polystyrene and a soft phase:
(1) DE 26 20 579
(2) DE 26 03 289 (equivalent to U.S. Pat. No. 2,012,462)
(3) U.S. Pat. No. 4,146,589
(4) EP 48 389
(5) U.S. Pat. No. 4,785,051

(3) and (1) disclose that it is possible to prepare styrene polymers having high gloss and to obtain good mechanical properties in such styrene polymers by means of a broad or bimodal particle size distribution. Furthermore, (4) discloses that both properties can be combined with one another if a bimodal particle size distribution is coupled with a certain particle morphology for the smaller particles.

(5) describes a styrene polymer which consists of a high impact polystyrene which is prepared by mass polymerization and has large rubber particles (cellular particles) and to which an agglomerated emulsion graft rubber has been added. Agglomeration of the latex results in a bimodal particle size distribution. In conjunction with the coarse-particled starting material, the result is a trimodal particle size distribution in the total mixture.

Compared with the unimodal product prepared by mass polymerization, a trimodal blend of this type leads on the one hand to substantially poorer flow properties and on the other hand to improvements in the mechanical properties, although this is due in particular to the high polybutadiene content obtained in this manner (cf. compositions 3 and 7 in (5)). Compared with bimodal products, the trimodal ones show no improvement (see compositions 9 and 10 as well as 11 and 12 in (5)). Furthermore, the process is very expensive compared with the pure mass polymerization, owing to the preparation and working up of the emulsion graft rubber. In addition, an emulsion graft rubber is known to have a much lower rubber efficiency than rubber particles which form during mass polymerization, since the latter typically also contain large amounts of included polystyrene in addition to a graft shell produced in situ or by the use of polystyrene/polybutadiene block rubber. It is known that the rubber content is not the only decisive factor with regard to the impact strength of polystyrene, but in particular also the rubber volume fraction which can be achieved with smaller amounts of rubber when the particles have a greater rubber efficiency (cf. S. G. Turley and H. Keskkula, Polymer 21 (1980), 466–468; C. B. Bucknail, Toughened Plastics, Applied Science Publishers, London (1977)).

Another disadvantage of emulsion polymerization is the entrainment of emulsifiers into the end product, which may adversely affect the color, clarity and sensitivity to ultraviolet light and to oxidation. Another factor is the greater environmental pollution compared with mass polymerization, owing to the contaminated water obtained in the preparation.

It is an object of the present invention to improve the inadequate impact strength in conjunction with good gloss, as can be obtained according to (4), without adversely affecting the gloss.

We have found that this object is achieved and that producing a certain trimodal rubber particle size distribution leads to products whose impact strength is substantially better than that of products having a bimodal particle size distribution (corresponding to (4)). This increase is not achieved at the expense of the gloss; because of the particular morphological composition, the gloss achieved is more advantageous than in the case of the conventional bimodal particle size distribution, the gloss being obtained even with a small proportion of products having encapsulated particles.

The present invention relates to a thermoplastic molding material containing, based on the sum of A and B, A: from 75 to 97% by weight of a polystyrene A as a hard matrix and B: from 3 to 25% by weight of a particulate, elastomeric (co)polymer B based essentially on butadiene or its copolymers, in turn consisting of, based on B, B1: from 40 to 98% by weight of a (co)polymer B1 having a mean particle size of from 100 to 600 nm and B2: from 2 to 60% by weight of a particle blend B2 which in turn consists of, based on B2, B21: from 1 to 60% by weight of a (co)polymer B21 having a mean particle size of from 200 to 1,200 nm and B22: from 40 to 99% by weight of a (co)polymer B22 having a mean particle size of from 1,200 to 8,000 nm, (co)polymer B1 having an encapsulated-particle morphology and (co)polymers B21 and B22 having a cellular and/or coiled particle morphology.

The novel product may consist of commercial high impact polystyrene grades which are prepared by mass polymerization and have been mixed in a simple manner by conventional methods.

The novel molding material thus contains, as component A, (ungrafted) polystyrene which is produced during the preparation of the molding material by a continuous method by polymerization in the presence of rubber-like polymers, or results from the mixing of melts or the dissolution and evaporation of three polystyrene resins which already have high impact strength and may be commercially available.

The most frequently used processes for the preparation of styrene polymers are mass polymerization and solution polymerization, as described in, for example, U.S. Pat. No. 2,694,692 and by H. Gerrens, Chem. Ing. Tech. 52 (1980), 477.

A natural or synthetic rubber conventionally used for toughening styrene polymers is employed as the rubber in high impact polystyrene. Suitable rubbers for the purposes of the present invention are natural rubber as well as, for example, polybutadiene, polyisoprene and copolymers of butadiene and/or isoprene with styrene and other comonomers, which have a glass transition temperature of less than −20° C. (according to K. H. Illers and H. Breuer, Kolloidzeitschrift 176 (1961), 110). Butadiene polymers containing from 25 to 99% by weight of the 1,4-cis compound are particularly suitable. However, it is also possible to use acrylate, EPDM, polybutylene and polyoctenamer rubbers.

The rubber-like (co)polymer B1 should have an encapsulated-particle morphology. What is understood by that term and the specific method for producing the morphology in question IS known (cf. Angew. Makromol. Chem. 58/59 (1977), 175–198). Polybutadiene or block copolymers of styrene and butadiene can be used, within the usual limits of the composition, to produce the encapsulated-particle morphology of component B1 of the novel molding materials. All that is important is that the polymerization conditions are determined by a few preliminary experiments with sampling during the prepolymerization phase which is critical for the formation of the morphology.

The (co)polymers B21 and B22 have a conventional cellular particle morphology familiar from high impact polystyrene, or a procedure which gives a coiled particle morphology is adopted. The preparation of rubber-like polymers having coiled particle morphology can readily be carried out in accordance with the publication cited above (Angew. Makromolekulare Chemie 58/59 (1977), 175–198).

In addition to components A and B, the novel molding material may contain, as component C for further improvement of the properties, additives as conventionally used for such polymers, for example fillers, antioxidants, dyes, UV stabilizers, processing assistants or flameproofing agents. The additives are used in usual amounts.

The preparation of the novel molding materials is simple. For example, it is possible to obtain the novel molding material by mixing three high impact polystyrenes each of which contains polystyrene as the matrix and the rubber-like polymers B1, B2 and B3 by melting. The same process can be carried out in solution with subsequent devolatilization. It is also possible to prepare three different graft polymers in a continuous process, separately to effect the prepolymerization with adjustment of the particle size and of the morphology of the particles and then to combine the two prepolymers in certain ratios and then to carry out polymerization of the combination until the required high solids content of, for example, 80 or 90% is obtained.

The novel molding materials can be processed into a very wide range of shaped articles by the methods conventionally used for processing thermoplastics, such as extrusion and injection molding.

EXAMPLES

In the Examples which follow, novel molding materials are compared with conventional commercial polystyrene grades or with the parent commercial high impact polystyrene grades.

The molding materials were prepared by mixing the melts. About 4.5 kg in each case were prepared in an extruder from Werner & Pfleiderer, Model ZSK 30, at a melt temperature of 250° C. Test specimens were injection molded at 280° C. from the products prepared by extrusion, and the following characteristics were then determined (the abbreviations used in the Tables are shown in brackets):

1. Penetration tests according to DIN 53,443 on injection molded circular disks (60×2 mm); the total damaging energy ($W_{tot}$) is stated in Nm.
2. The gloss was measured at 60° using a laboratory reflectometer (from Dr. Lange), according to DIN 67,530. The reflectometer value is stated in scale divisions.

The following components were used for the preparation of molding materials according to the invention and of those not according to the invention.

SB1 A commercial high impact polystyrene containing 9% of polybutadiene and having an intrinsic viscosity (0.5% strength in toluene at 23° C.) of 76 ml/g, an MVI (200/5) of 4.3 cm$^3$/10 min, an encapsulated-particle morphology and a $d_{50}$ value of the integral volume distribution of 0.28 μm.

SB2 A commercial high impact polystyrene containing 8% of polybutadiene and having an intrinsic viscosity (0.5% strength in toluene at 23° C.) of 73 ml/g, an MVI (200/5) of 6.2 cm$^3$/10 min, a cellular particle morphology and a $d_{50}$ value of the integral volume distribution of 0.7 μm.

SB3 A commercial high impact polystyrene containing 8% of polybutadiene and having an intrinsic viscosity (0.5% strength in toluene at 23° C.) of 70 ml/g, an MVI (200/5) of 5.5 cm$^3$/10 min, a cellular particle morphology and a $d_{50}$ value of the integral volume distribution of 2.7 μm.

EXAMPLE 1, according to the invention

This Example shows the disproportionately large increase the impact strength (measured as penetration energy) of the novel molding materials having a trimodal rubber particle size distribution compared with those not according to the invention. Furthermore, the gloss decreases only insignificantly with decreasing content of encapsulated-particle product in the range claimed according to the invention.

| SB1 [% by wt.] | SB2 [% by wt.] | SB3 [% by wt.] | $W_{tot}$ [Nm] | Gloss [scale divs.] |
|---|---|---|---|---|
| 100* | — | — | 7.1 | 63.5 |
| 95 | 2.5 | 2.5 | 16.7 | 63.6 |
| 90 | 5.0 | 5.0 | 20.2 | 63.1 |
| 80 | 10 | 10 | 17.3 | 63.8 |
| 60 | 20 | 20 | 12.7 | 62.5 |
| 40 | 30 | 30 | 12.4 | 62.1 |
| —* | — | 100 | 8.8 | 50.9 |

*not according to the invention

COMPARATIVE EXPERIMENT

This experiment shows the inferiority of molding materials having only a bimodal particle size distribution compared with those having a trimodal one (cf. Example 1). The impact strength is substantially lower and the gloss even begins to decrease at a higher content of encapsulated-particle product.

| SB1 [% by wt.] | SB2 [% by wt.] | SB3 [% by wt.] | $W_{tot}$ [Nm] | Gloss [scale divs.] |
|---|---|---|---|---|
| 100* | — | — | 7.1 | 63.5 |
| 95* | — | 5.0 | 13.6 | 62.1 |
| 90* | — | 10 | 14.6 | 61.9 |
| 80* | — | 20 | 14.8 | 61.6 |
| 0* | — | 100 | 8.8 | 50.9 |

We claim:
1. A thermoplastic molding material comprising, a high-impact polystyrene containing (A) from 75–97% by weight of polystyrene as a hard matrix, and (B) from 3 to 25% by weight of particulate, elastomeric (co)-polymer based essentially on butadiene or its copoly- mers and having a glass transition temperature of less than −20° C., in turn consisting of, based on B
- B1: from 40 to 98% by weight of a (co)polymer B1 having a means particle size of from 100 to 600 nm and
- B2: from 2 to 60% by weight of a particle blend B2 which in turn consists of, based on B2,
  - B21 from to 1 to 60% by weight of a (co)polymer B21 having a mean particle size of from 200 to 1200 nm and
  - B22 from 40 to 99% by weight of a (co)copolymer B22 having a means particle size of from 1200 to 8000 nm, (co)polymer B1 having an encapsulated-particle morphology and (co)polymers B21 and B22 having a cellular and/or coiled particle morphology.

2. A thermoplastic molding material as claimed in claim 1, comprising high impact polystyrene containing 8.95% by weight of component B, wherein component B consists of 95.5% by weight component B1, 2.25% by weight component B21 and 2.25% by weight component B22.

3. A thermoplastic molding material as claimed in claim 1, comprising high impact polystyrene containing 8.4% by weight of component B, wherein component B consists of 42.8% by weight component B1, 28.6% by weight component B21 and 28.6% by weight component B22.

4. A thermoplastic molding material as claimed in claim 1, wherein (co)polymers B1, B21 and B22 are polybutadiene.

5. A thermoplastic molding material as claimed in claim 1, further comprising an additive selected from the group consisting of fillers, antioxidants, dyes, UV stabilizers, processing assistants and flame-proofing agents.

6. A shaped article comprising the thermoplastic molding material of claim 1.

7. A thermoplastic molding material consisting essentially of high-impact polystyrene containing (A) from 75 to 97% by weight of polystyrene as a hard matrix, and (B) from 3 to 25% by weight of particulate, elastomeric (co)polymer based essentially on butadiene or its copolymers and having a glass transition temperature of less than −20° C., in turn consisting of, based on B
- B1: from 40 to 98% by weight of a (co)polymer B1 having a means particle size of from 100 to 600 nm and
- B2: from 2 to 60% by weight of a particle blend B2 which in turn consists of, based on B2,
  - B21 from to 1 to 60% by weight of a (co)polymer B21 having a mean particle size of from 200 to 1200 nm and
  - B22 from 40 to 99% by weight of a (co)copolymer B22 having a means particle size of from 1200 to 8000 nm, (co)polymer B1 having an encapsulated-particle morphology and (co)polymers B21 and B22 having a cellular and/or coiled particle morphology.

8. A thermoplastic molding material as claimed in claim 7, consisting essentially of high impact polystyrene containing 8.95% by weight of component B, wherein component B consists of 95.5% by weight component B1, 2.25% by weight component B21 and 2.25% by weight component B22.

9. A thermoplastic molding material as claimed in claim 7, consisting essentially of high impact polystyrene containing 8.4% by weight of component B, wherein component B consists of 42.8% by weight component B1, 28.6% by weight of component B21 and 28.6% by weight component B22.

10. A thermoplastic molding material as claimed in claim 7, wherein (co)polymers B1, B21 and B22 are polybutadiene.

11. A thermoplastic molding material as claimed in claim 7, further consisting essentially of an additive selected from the group consisting of fillers, antioxidants, dyes, UV stabilizers, processing assistants and flame-proofing agents.

12. A shaped article comprising the thermoplastic molding material of claim 7.

* * * * *